(12) United States Patent
Dingler

(10) Patent No.: US 6,505,454 B2
(45) Date of Patent: *Jan. 14, 2003

(54) STRUCTURAL MEMBER

(76) Inventor: Gerhard Dingler, Schillerstrasse 49, D-72221 Haiterbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,945
(22) PCT Filed: Jun. 18, 1997
(86) PCT No.: PCT/EP97/03186
§ 371 (c)(1), (2), (4) Date: Jun. 1, 1999
(87) PCT Pub. No.: WO97/49877
PCT Pub. Date: Dec. 31, 1997

(65) Prior Publication Data
US 2002/0112428 A1 Aug. 22, 2002

(30) Foreign Application Priority Data
Jun. 22, 1996 (DE) .......................................... 196 25 080
Jun. 10, 1997 (DE) .......................................... 197 24 361

(51) Int. Cl.⁷ ................................................ E01C 3/29
(52) U.S. Cl. .................... 52/729.5; 52/729.2; 52/730.1; 52/731.1; 52/737.4; 52/738.1; 52/309.9; 52/309.16
(58) Field of Search ............................ 52/729.1, 729.2, 52/738.1, 737.1; 264/45.9, 46.1; 428/457, 138, 131, 458, 461

(56) References Cited

U.S. PATENT DOCUMENTS 2,855,021 A   7/1958  Hoppe
5,511,355 A * 4/1996  Dingler ..................... 52/729.5

FOREIGN PATENT DOCUMENTS

| DE | 1434058 | 10/1969 |
| DE | 1965272 | 7/1971 |
| DE | 4137649 | 5/1993 |
| GB | 2186655 | 8/1987 |
| GB | 2202180 | 9/1988 |

OTHER PUBLICATIONS

German Patent Document DE3438448 dated Feb. 24, 1986.

* cited by examiner

Primary Examiner—Carol D. Friedman
Assistant Examiner—Kevin McDermott

(57) ABSTRACT

The invention relates to a structural member and a process for producing a structural member with at least one layer of plastic and with a layer inside the structural member of a material that has a substantially higher modulus of elasticity than plastic. The member also has at least one system plane that is part of the structural member and along which the structural member has substantially homogenous properties and a substantially homogeneous structure. The invention is characterized in that along the system plane, at least one inner layer and a respective outer layer consisting of plastic are provided between which two layers each separated from each other and traversing the system plane with the second higher modulus of elasticity are provided.

38 Claims, 4 Drawing Sheets

STRUCTURAL MEMBER

CROSS-REFERENCE TO RELATED APPLICATIONS

Not applicable.

Statement Regarding Federally Sponsored Research or Development

Not applicable.

BACKGROUND OF THE INVENTION

FIELD OF THE INVENTION

This invention relates to a structural member and a process for producing a structural member with at least one layer of plastic and with a layer inside the structural member that has a substantially higher modulus of elasticity than plastic.

Such structural members are frequently, but not exclusively, used in the building industry. A structural member is known from German Patent DE-41 37 649 A1 which consists in general of plastic with a first low modulus of elasticity and with a layer within the building element of a material which has a second, substantially higher modulus of elasticity. This layer, which preferably consists of an aluminum alloy, has a system plane along which the profiled layer extends. For a plate-shaped element, for example, the system plane lies in a cross section of the plate-shaped structural member and the layer is constructed in a trapezoidal shape, with the layer running point-symmetrically to the system plane. The sections of the trapezoidal layer which run substantially parallel to the outer wall are connected together by sections which run diagonally, so that a section of the layer is provided reciprocally to the system plane and running substantially parallel to the outer layer. The stratification of such a layer in a structural member consisting of plastic with a low modulus of elasticity can give an increase of 5–15% in the modulus of elasticity of the structural member, for example. The sections of the layer which run diagonally and traverse the system plane then serve as shear bridges whereby the shear forces acting on the structural member can be better taken up and the modulus of elasticity of the structural member can be increased.

An I-beam is furthermore known from DE 41 37 649 A1, and is constructed analogously to the plate-shaped structural member. A layer which has a head region and a foot region connected together by a zigzag-shaped middle region is installed in the I-beam. This middle region forms a shear or thrust bridge between the head and foot regions of the layer which is installed in the structural member. Thus forces acting on the structural member can be better taken up, since an increase in the overall modulus of elasticity is attained by means of this layer, in comparison with a structural member without such a layer.

Such structural members are indeed superior to the heretofore known structural members of wood or plyboard in regard to waste disposal and recycling capability. However, the construction and development of the layers requires more processing steps for their profiling, so that production is expensive because of the bonding of the profiled layer into the structural member. The modulus of elasticity of the structural member of plastic with inlaid layers could be improved over those made of wood or by a phenolic resin bonding; however, the field of application is limited because of the relatively low modulus of elasticity of the member.

The invention therefore has as its object to provide a structural member which is easily produced and which makes possible an increase of the load-bearing ability because of a higher modulus of elasticity of the member due to the construction. A further object of the invention is to provide a process for the production of the structural member, making possible a cost-effective production of the structural member according to the invention with a high output of structural members.

These objects are achieved by a structural member with at least one system plane along which the structural member has substantially homogeneous properties and is substantially homogeneously constructed, comprising: at least one inner layer of plastic along the system plane, a respective outer layer of plastic along the system plane, and at least a respective layer of material of a substantially higher modulus of elasticity than plastic traversing the system plans and located within the structural member between the inner layer and the outer layer and arranged separated from each other. These objects are also achieved by the following process:

a) supplying an unfoamed inner layer from an extruder to a coextrusion nozzle, b) supplying by means of the coextrusion nozzle a respective layer of substantially higher modulus of elasticity taken off from a respective sheet metal coil to an upper side and a lower side of the inner layer, c) applying a respective outer layer by means of the coextrusion nozzle to the layers of substantially higher modulus of elasticity, d) supplying a multilayer composite emerging from the coextrusion nozzle to a gauging, e) withdrawing the multilayer composite from the gauging after the inner layer has foamed, and f) cutting the multilayer composite into structural members.

The structural member designed according to the invention has the advantage that at least a 1 ½ times increase of the modulus of elasticity of the member can be attained, in comparison with the structural members known from the state of the art, by means of a simple arrangement and design of the layers constructed with a second, higher modulus of elasticity and built into the plastic body. It is provided therefor that two layers, which are separate from each other and which traverse the system plane, with a second higher modulus of elasticity are inserted into the structural member between an inner layer and an outer layer. These layers have respective points of intersection with the system plane which advantageously are as far apart as possible and are arranged near the wall region of the structural member. A so-called sandwich structure can thereby result, in which a core layer consisting of plastic is bounded by an upper and a lower layer with a second, higher modulus of elasticity, which in their turn can be covered with at least one outer layer consisting of plastic.

The layers with the second, higher modulus of elasticity are not connected together directly, i.e., the sections traversing the system plane and forming a shear bridge were omitted. It would have been expected, from calculations according to Steiner's theorem, that in such a configuration a smaller load-bearing capacity or a smaller stiffness of the member would be attained, since a combined action between an upper and a lower layer would not be given by the lacking middle region or shear bridge. It was assumed that a structure with a shear bridge omitted would not act as an overall structural member, but rather as two structural members connected in parallel and only slightly affecting each other. Furthermore, it was assumed that creep would not be prevented, due to the lacking shear bridge.

Contrary to this interpretation, however, it has been found that exactly by means of this configuration, in which an upper and a lower layer are arranged separated from each other in an edge region of the outer layers of a structural member, an increase of the stiffness of the member by at least a factor of 1.5 can be made possible.

This increase of the stiffness of the member is based, according to knowledge at the time of the application, firstly on the use substantially of layers which go all through in the edge region of the structural member, and which make it possible for forces to be better taken up. In contrast to this, it is known from the plate-shaped member according to the state of the art, that because of the trapezoidal construction of the layer, only partial sections are provided which are not mutually connected in the edge region, whereby a smaller load absorption is given when bending stresses are applied. On the other hand, a combined action can nevertheless be attained, so that an increase of the modulus of elasticity of the member can be attained by the cooperation of the inner layer with the layers with higher modulus of elasticity bounding the inner layer, and the outer layers applied to these layers. It has furthermore been found that creep behavior is directly dependent on the high tensile stresses in the outermost zone and on the shear bridge formation.

An advantageous embodiment of the invention provides that the layers have a adhesion primer. A full-surface bonding between the inner layer and the outer layer to the layers with higher modulus of elasticity can thereby be made possible.

The adhesion primer, preferably applied to both sides, furthermore has the advantage that the bonding of the plastic layers and the layers which are preferably of aluminum alloy is not loosened in the cooling process during production. The thermal expansion of an aluminum alloy is smaller than that of plastic. A good bonding of the cooling plastic to the layer can nevertheless be maintained by means of the adhesion primer. A foamed inner layer is preferably used, having a degree of foaming which increases toward the middle axis, so that elastic displacements are possible which in addition contribute to the bond's not becoming loosened.

The process according to the invention for the production of such structural members has the advantage that a continuous production of structural members is made possible in a simple manner. In this process, the materials required for the whole structural member for the formation of the individual layers of the sandwich structure can be supplied and processed simultaneously, or nearly simultaneously, through a coextrusion nozzle. The layers are then fed as a composite to a gauging step. The layers which are mutually spaced apart and are separated by an inner layer can be drawn from a coil of sheet metal and supplied to an upper side and a lower side of the inner layer. Furthermore, an outer layer can be simultaneously applied to the layers by means of the coextrusion nozzle. The coextrusion nozzle can be followed at a short distance by a gauging step. It is thereby possible for the inner layer, which can have a high foaming fraction of at least 30%, to be supplied directly to the gauging step. The foaming process thus takes place exclusively in the gauging step. The two layers, seen from a longitudinal middle axis, can be pressed into an upper and a lower edge region by the inner layer in the course of foaming, so that the intersection points of the layers with the system plane can be spaced mutually far apart.

Further advantageous embodiments and developments are given in the further claims of the description hereinafter and in the accompanying drawings.

DETAILED DESCRIPTION OF PREFERRED EMBODIMENTS

Figure 1:
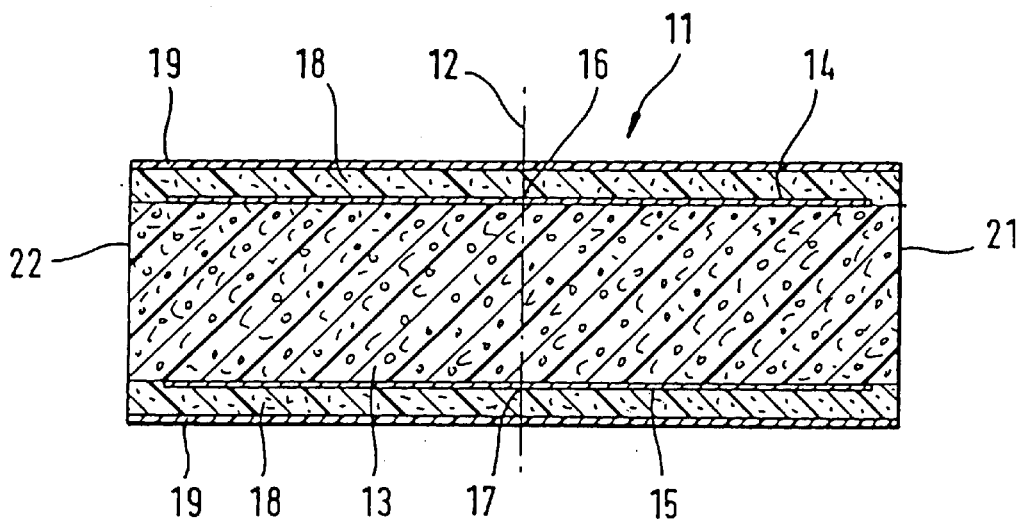
FIG. 1 shows a schematic cross section through a plate-shaped structural member.

A cross section through a plate-shaped structural member 11 is shown in FIG. 1. These structural members 11 can have a thickness of 12–23 mm, for use in the building industry. The length and width can be provided in dependence on the case of application; preferably, a width of 1–2 m and a length of 2.5–6 m is provided.

The structural member 11 has a system plane 12 which corresponds to a principal axis of the plate-shaped structural member 11. An inner layer 13 or a core layer of the plate-shaped structural member 11 consists of a plastic, which can have a modulus of elasticity corresponding to the application. A foamed plastic is advantageously provided, having a degree of foaming between 20% and 60%. The inner layer 13 is preferably made of a relatively inexpensive material, for example, polypropylene which has been recycled. The inner layer 13 can additionally be filled with materials which increase the strength. These can for example be talc and/or glass fibers. Talc has the advantage over glass fibers that it reacts isotropically, in contrast to which glass fibers have a preferential direction during heating, which can be disadvantageous in some cases.

The inner layer 13 of the structural member 11 is bounded by an upper layer 14 and a lower layer 15. The layers 14, 15 extend substantially completely over the whole width of the structural member 11 and traverse the system plane 12 at an intersection point 16 and 17. The layers 14, 15 are constructed of a light metal, in particular, aluminum or an aluminum alloy such as, for example, AlMgSi0.5. Alternatively, other light metal materials or metals, can be used. Furthermore, woven fabrics, mattings, or knitted fabrics can be provided, which are worked in depending upon direction corresponding to the principal direction of loading. The layers 14, 15 are made planar and extend substantially completely over the whole width of the plate-shaped structural member 11. Alternatively, it can be provided that a perforated and/or corrugated and/or trapezoidal and the like shaped layer, or if necessary a layer constructed as a hollow profile, is inserted.

The layers 14, 15 are constructed as foils or metal sheets, and have a thickness of 0.25–3 mm, in dependence on the distance between them and the forces to be taken up, and also in dependence on the material used for the inner layer 13. In order to attain a composite action with the plastic materials, it is required that the layers 14, 15 are relatively thin. This has the advantage that the structural member 11 is easily nailed and/or sawn, in particular when a layer of light metal is used.

An outer layer 18, which likewise consists of plastic, is provided on the layers 14, 15. The same plastic as for the inner layer 13 can be used for this outer layer 18. An unfoamed plastic is preferably used for the outer layer 19, and is, for example, a polyamide and/or polypropylene. The outer layer is filled with glass fibers; in a proportion of 20–40% of glass fibers. An outer layer 18 can thereby be created which has a high modulus of elasticity in comparison with the inner layer. In order to be suitable for building sites, the outer layer 18 is constructed as a high strength layer. Additives can be incorporated into this outer layer 18, in order to make the outer layer 18 weather resistant and/or UV resistant and/or impact resistant. The abrasion resistant outer layer 18 has a thickness of about 1–2 mm. It is basically provided that the thickness of the outer layer 18 makes up about 10% of the total thickness of the structural member 11.

According to the embodiment shown in FIG. 1, a slip layer 19 is applied to the outer layer 18. The object of this is substantially that smaller forces are required in order to forward the structural member out of a gauging step during the continuous production of the plate-shaped structural member 11. A thermoplastic material, for example, polypropylene with additives, which has good sliding properties, is used for the slip layer 19. Furthermore, cement rejecting or UV resistant or weather resistant additives can be included. A slip layer 19 having a layer thickness of 0.1–0.2 mm is sufficiently thick.

The side faces 21, 22 of the structural member 11 can be constructed as open, in contrast to wood. The layers 14, 15 can extend as far as the side faces 21, 22 or be arranged at a small distance from the side faces. The plastics used take up substantially no water, and also no water can penetrate between the individual layers 13, 14, 15, 18, 19. Thus a further work step, and thus costs, to close the side faces can be saved.

By means of a sandwich construction for a plate-shaped structural member 11 according to FIG. 1, an increase of the modulus of elasticity by a factor of at least 1.5 is made possible, in comparison with the plate-shaped structural members known from the state of the art with a trapezoidal layer. The known plate-shaped structural member with a trapezoidal aluminum layer known from DE 41 37 649 A1 has, for example, a modulus of elasticity of the member of about 2,200 N/mm$^2$. Using the same materials, a modulus of elasticity of the member of about 3,500 N/mm$^2$ can be attained by means of the embodiment of the plate-shaped structural member 11 with an aluminum sheet which has a hole proportion of about 40%, and a modulus of elasticity of the member of about 5,000 N/mm$^2$ with an unperforated aluminum sheet. This rise of the modulus of elasticity is substantially based on the layers 14, 15 having a adhesion primer layer on both sides, so that in the ideal case the materials of the inner layer 13 and the outer layer 18 can become bonded together as one. An increase of the stiffness of the plate-shaped element 11 under the action of a bending force or shearing stress can thereby be given. The layers 14, 15 then do not act, as was at first assumed, as loose layers which are arranged one above the other and would thus exclude a mutual effect. It has surprisingly been found that the foamed plastic of the inner layer 13 and also the outer layer 18, in conjunction with the primer, have a high adhesion to the layers 14, 15, and higher bending stiffness than in the state of the art, given by the modulus of elasticity multiplied by the geometrical moment of inertia, can be attained.

In the embodiment of a plate-shaped structural member 11, attention has to be paid to the proportionality of the thicknesses of the individual layers 13, 14, 15, 18, 19 and also the selection of materials for the respective layers 13, 14, 15, 18, 19. With an overstressing of the structural member 11, two effects can arise: firstly, the outer layer can first tear, and this can then lead to breakage of the layers 14, 15, until there is a complete break of the plate-shaped element. Secondly, the core layer can first fail because the shear stress was too great and the shear strength was not sufficiently large, so that a break of the plate element can likewise occur.

In the first case, this means that the outer layer 18 can no longer take up the outer fiber extension, which thereby suggests that the outer layer 18 ought to be made more elastic or thicker. Furthermore, to prevent this case, the measure was taken that the layers 14, 15 become thicker and the member stiff, so that the outer fiber extension becomes reduced.

In the second case, the thickness of the inner layer 13 can be increased, or another plastic with higher strength properties can be selected. It can furthermore be provided that in order to increase the stiffness of the inner layer 13, the foam fraction is reduced and the talc and/or glass fiber fraction is increased. The matching of the materials to each other is evident from the above-mentioned cases. For example, the ratio between the first, higher modulus of elasticity and the second, lower one can be 3–5:1, where the lower modulus of elasticity can be in the region of 600–1,200 N/mm$^2$. Further larger and smaller ratios can also be in dependence on the primer.

A preferred embodiment for a structural member with a plate thickness of 20 mm has an inner layer of foamed polypropylene, 17 mm thick, with a 20–40% fraction of talc. The layer 14, 15 consists of a foil, 0.35 mm thick, of an aluminum alloy AlMgSi0.5, with adhesion primer on both sides. The outer layer 18 is an unfoamed PP with a 30–40% glass fiber fraction, and is 1 mm thick, finished with a slip layer 19, 0.1 mm thick.

Figure 2:
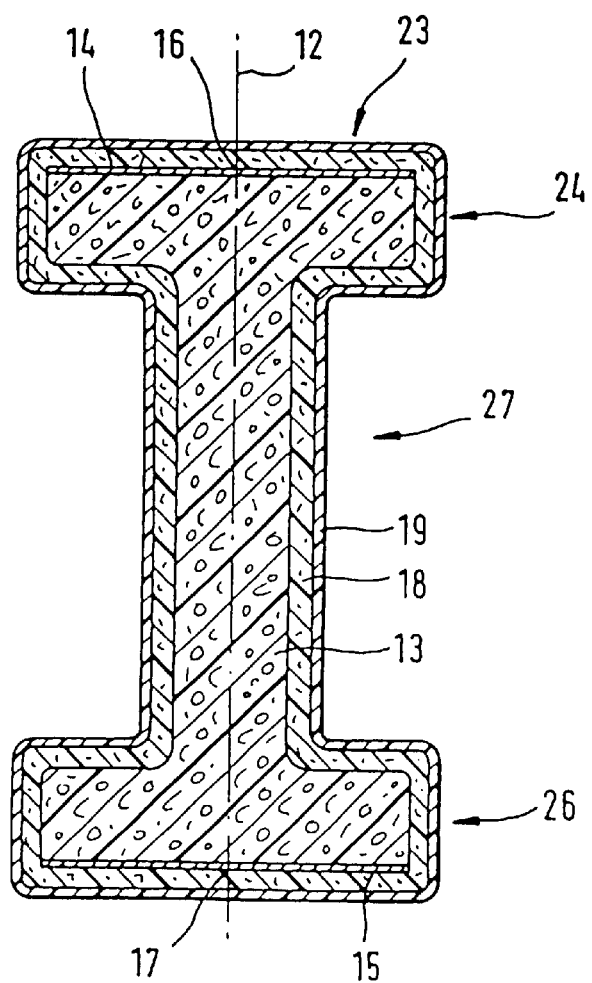
FIG. 2 shows a schematic cross section through an I-beam.

An I-beam 23 is shown in FIG. 2, and has a structure along the system plane 12 analogous to that of the plate-shaped structural member 11. The layers 14, 15, with their points of intersection 16, 17, are spaced apart as far as possible, so that the layers 14, 15 with a higher modulus of elasticity are as near as possible to the edge region of a transverse web 24 and 26, in order to make possible the greatest possible influence on the outer fiber extension during bending. The layers 14, 15 measure about 1 mm in this embodiment. Specifically to the application, it can be possible for one of the layers 14, 15 to be made thicker than the other. Such an I-beam would then be arranged such that the transverse web 26 with the thicker layer 15 would have to take up the maximum outer fiber extension. In the side surfaces of the transverse webs 24, 26 and in the middle web 27, the inner layer 13 and the outer layer 18, and also the slip layer 19, are situated immediately adjacent. The I-beam 23 can thereby have an all-around wear resistant layer and can be made suitable for a building site.

For example, with an embodiment of an I-beam 23 with a layer 14, 15 of, for example, 1 mm and an inner layer 13 which can take up a shear stress of about 2.5 N/mm$^2$, according to the equation by which the shear stress is equal to the quotient of the lateral force and the surface area of the middle region or web, the middle region would have to have a width of 50 mm, the height of the I-beam 23 being 160 mm, in order to be able to take up a lateral force of 20 kN.

As for the rest, the alternative embodiments or their optional combinations set out for the structural member 11 also hold for the I-beam 23, and vice versa.

Figure 3:
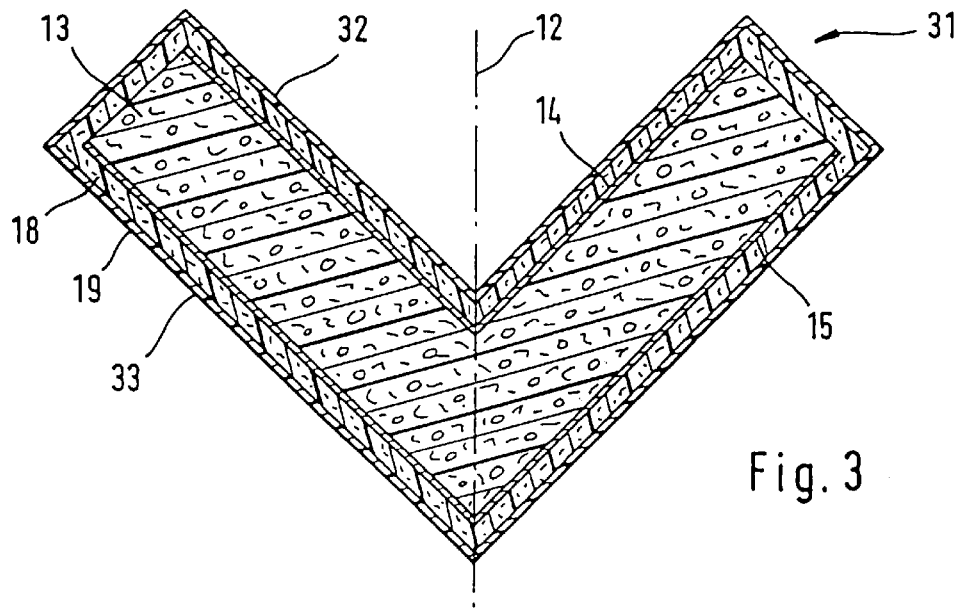
FIG. 3 shows a schematic cross section through an angle profile.

FIG. 3 shows an angle profile 31 which is constructed to be substantially symmetrical to the system plane 12. The layers 14, 15 run substantially parallel to the outer surfaces 32, 33 and are arranged near to the outer surfaces 32, 33.

Figure 4:
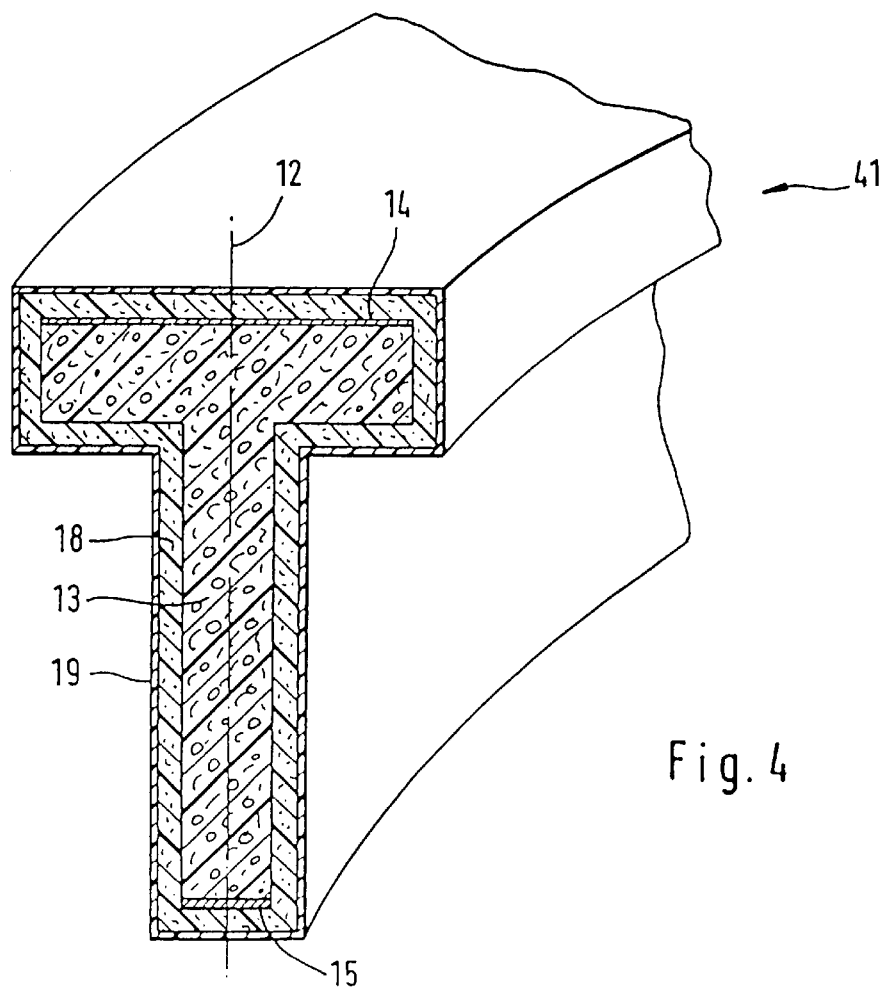
FIG. 4 shows a schematic cross section through a T-profile.

FIG. 4 shows a T-beam, which has a structure analogous to that of the structural member 11 along the system plane 12. It can advantageously be provided for the T-beam 41 that the layer 15 is thicker than the layer 14, in order to be able, because of the smaller width which the free end of the vertical web has, to better take up the bending which arises. The layer 15 can, for example, be made twice as thick as the layer 14. This will substantially be the case when the layer 14 and the layer 15 are made of the same material. The layers 14, 15 can also be of equal thickness, and different materials can then be used, so that, for example, the layer 14 is made of an aluminum alloy and the layer 15 of sheet steel or the like. The thickness dimensions can thereby be matched in dependence on the elastic moduli.

The use of different materials and substantially equal thicknesses, or of the same materials and different thicknesses, can also be provided in all the other embodiments.

Figure 5:
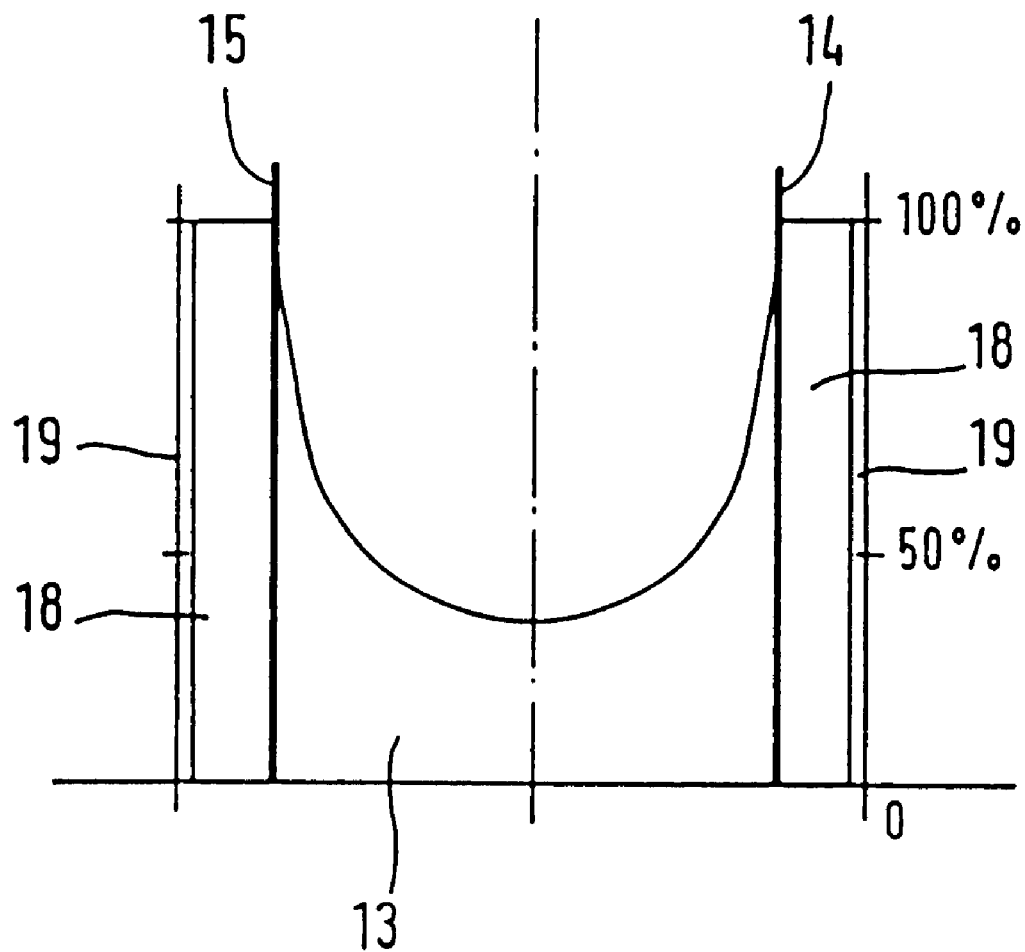
FIG. 5 shows the course of a curve over the cross section which qualitatively indicates the ratio of plastic material to cavities.

A diagram along the system plane is shown in FIG. 5. The outer surfaces 18, 19 have a density of respectively 100%. The inner layer 13 is foamed, that is, in the middle region with a 60% foam content, a 40% content of material is present. The foam content continuously decreases toward the layers 14, 15, and there is practically no foam content near the layers 14, 15, so that there can be an optimum bonding to the layers 14, 15.

Such a structure or course of the density can basically be provided for any shape of structural member and can have the advantageous properties such as, for example, that a structural member of good flexural strength can be provided by means of a small structural member volume and by the use of inexpensive materials, and is constructed to be weather resistant, UV resistant and impact resistant, and can furthermore be used for building operations, in which it is distinguished by being easily nailed and sawn because of the relatively thin layers 14, 15.

Figure 6:
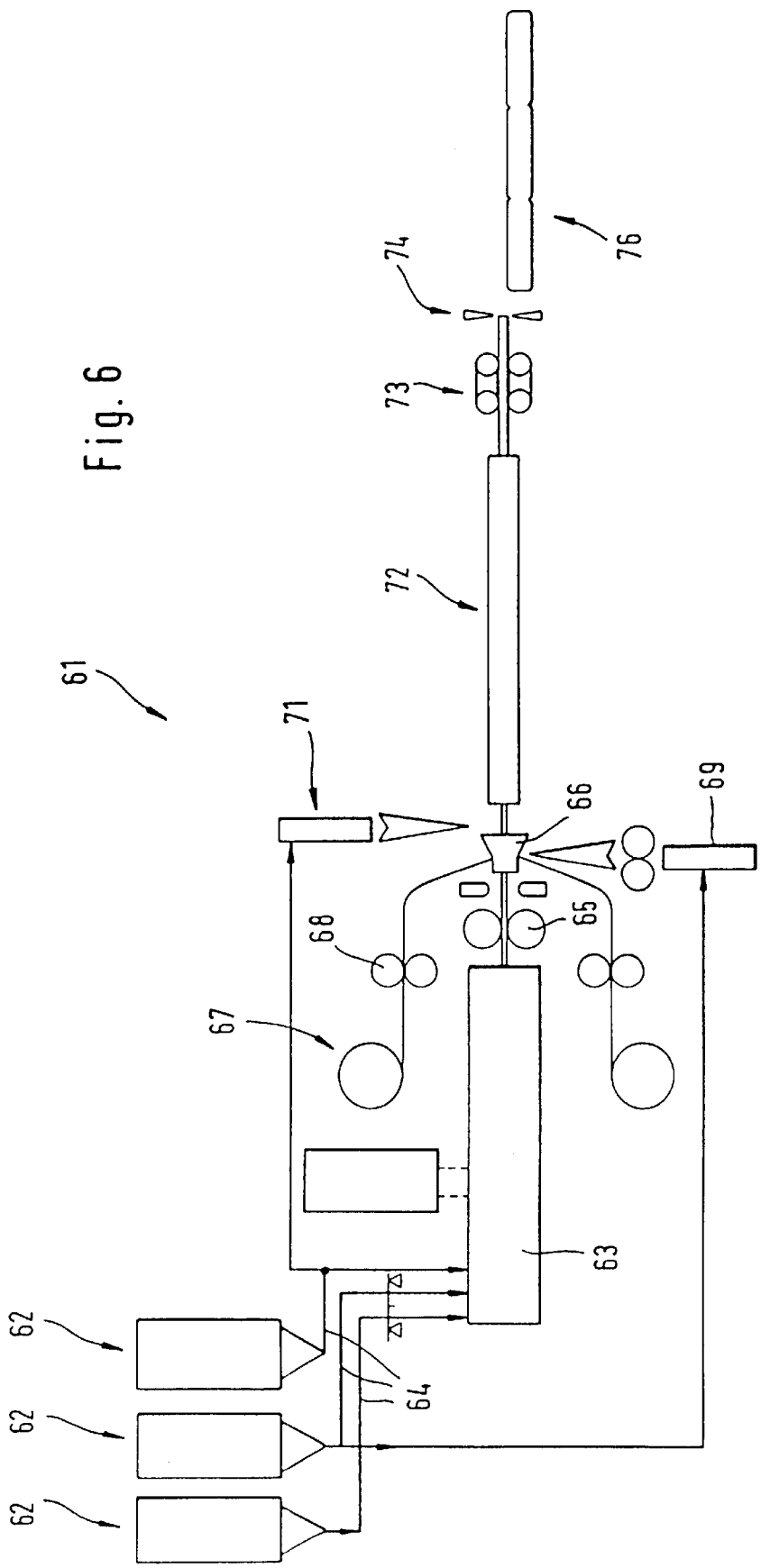
FIG. 6 shows a schematic diagram of a plant for carrying out the process and for the production of a structural member according to the invention.

A plant is shown in FIG. 6 for carrying out a process which is provided for the production of the structural members 11, 23, 31, 41. The production of the different structural members 11, 23, 31, 41 is described using the plate-shaped structural member 11 as an example.

Various kinds of plastic granules, fillers and further additives which are required for the production of the plate-shaped element 11 are made available in bins 62. For example, polypropylene can be provided in a first bin 62, polyamide in a second bin 62, and glass fibers in a third bin 62. For the production of the inner layer 13, polypropylene and also an additive for foaming are supplied via supply ducts 64 from the bins 62 to a double screw extruder 63. The individual components are homogenized in the double screw extruder 63 and are fed via a melt pump 65 to a coextrusion nozzle 66. A coil 67 with a takeoff device 68 is arranged respectively above and below the coextrusion nozzle 66. The layers 14, 15, which for example are made from an aluminum foil, 0.3 mm thick, are taken off from the coils 67 and fed to the coextrusion nozzle 66. The aluminum foils 14, 15, stored beforehand on respective coils 67, are provided on both sides with a adhesion primer so that an optimum adhesion of the inner layer 13 and the outer layer 18 to the aluminum foil 14, 15 is made possible. These layers 14, 15 can also be sprayed with primer, and if necessary dried, directly after takeoff from the coil 67.

An extruder 69 follows the supply of the aluminum foil 14, 15, and is supplied with, for example, polyamide and/or polypropylene and glass fiber from the bins 62. The homogenized mass for the outer layer 18 can be supplied by means of this extruder 69 to the coextrusion nozzle 66. Furthermore, a slip layer extruder 71 can be provided, following the supply of the outer layer 18, in order to be able to apply the slip layer 19 to the outer layer 18.

A 5-layer plate with a sandwich structure can be produced in one operation by means of the coextrusion nozzle 66, which is provided for a plate thickness of 20 mm, for example. The coextrusion nozzle is followed by a gauging step 72. The path between the outlet of the coextrusion nozzle 66 and the beginning of the gauging step 72 is made short, since the inner layer is provided with a blowing agent for foaming the polypropylene. This blowing agent has the effect that the layers 14, 15 which bound the inner layer 13 are substantially uniformly pushed apart during the passage through the gauging path. It can thereby be attained that the layers 14, 15 run substantially parallel to each other. Furthermore it can be attained by means of the increased pressure that the outer layers 18 have a nearly 100% density. The force acting on the outer layers 18, 19 furthermore has the advantage that a substantially closed outer layer can be produced, which is known as a so-called "bacon layer".

Due to the application of the slip layer 19, the structural member 11 can pass through the gauging step 72 with little friction and can more easily be withdrawn from the gauging step 72 with a takeoff device 73. The gauging step 72 is constructed such that the gauging path is sufficient for the structural member 11 leaving the gauging step 72 to have a completely foamed inner layer 13. The continuously produced structural member 11 can be cut into the desired plate sizes by means of a saw device 74 which travels corresponding to the production or extrusion speed, and can be made ready for transportation or storage, by a stacking device 76.

Such a plant 61 can have a production speed of 0.5–1 m/min. A relatively simple bringing together of the individual components for a composite structure of the structural member 11 can be given by the embodiment according to the invention of the structural member 11 with two layers 14, 15 running substantially parallel to the inner layer 13 and the outer layers 18, 19, and furthermore the structural member 11 also has a higher bending stiffness. This process can likewise be used for the structural members 23, 31, 41 described in FIGS. 2–4, and also for other shapes of structural members.

A sinter press process can also be provided for the production of structural members 11, particularly plate-shaped structural members. In this process, the individual layers are successively placed one on the other and then caused to bond together by heat and pressure. High temperatures and pressures are necessary for this, so that no inhomogeneities arise which could act as fracture loci. Because of the discontinuous production and the high pressures, this process is preferably used for special shapes with low numbers of pieces.

The structural member 11 can advantageously have a prestress so that there is an increased ability to take up forces or loads in a given built-in position. This prestress is advantageously applied during the extrusion process. After the sandwich structure of the element has been completely extruded, a gauging follows by means of a calendering technique or the like, the gauging step being placed immediately following the extruder nozzle so that the still heated plastic can be processed. The extruded plate can also be taken off over a large radius in order to apply the prestress. The prestress is advantageously provided such that the neutral fiber of the structural member lies nearly in a flat plane in the case of controlled loading.

It can alternatively be provided that the structural members can be produced by means of a pressing technique. In this technique, the layers of higher elasticity, such as for example a layer of an aluminum or titanium alloy, are preshaped, preferably plastically, are placed in, and then have plastic extruded around them. Alternatively, the preshaping can take place by means of a corresponding tool construction and its control.

What is claimed is:

1. An elongate structural member with at least one system plane along which the structural member has substantially homogenous properties and is substantially homogeneously constructed, comprising:
   at least one inner layer of plastic along the system plane,
   a respective outer layer of plastic along the system plane, and
   at least two respective layers of a material of a substantially higher modulus of elasticity than plastic traversing the system plane and located within the structural member between the inner layer and the outer layer and arranged separate from each other and not connected by a middle region of the same material as said at least respective layer.

2. The structural member according to claim 1, in which the layers of substantially higher modulus of elasticity have a respective intersection point with the system plane, and are arranged in outer regions of the structural member.

3. The structural member according to claim 1, in which the layers of plastic and the layers of substantially higher modulus of elasticity extend symmetrically of the system plane.

4. The structural member according to claim 1, in which the layers of substantially higher modulus of elasticity are at least planar or holohedral.

5. The structural member according to claim 1, in which the layers of substantially higher modulus of elasticity have perforations.

6. The structural member according to claims 1, in which the layers of substantially higher modulus of elasticity are profiled.

7. The structural member according to claim 1, in which the layers of substantially higher modulus of elasticity are arranged substantially parallel to each other.

8. The structural member according to claim 1, in which the layers of substantially higher modulus of elasticity have a thickness of about 0.2–3 mm.

9. The structural member according to claim 1, in which the layers of substantially higher modulus of elasticity are comprised of light metal.

10. The structural member according to claim 1, in which the layers of substantially higher modulus of elasticity are comprised of aluminum or aluminum alloy.

11. The structural member according to claim 1, in which the layers of substantially higher modulus of elasticity are comprised of metal.

12. The structural member according to claim 1, in which the layers of substantially higher modulus of elasticity are comprised of non-magnetic material.

13. The structural member according to claim 1, in which the layers of substantially higher modulus of elasticity are comprised of fiber reinforced material.

14. The structural member according to claim 1, in which the respective outer layer comprises upper and lower outer layers of equal thickness.

15. The structural member according to claim 1, in which each respective outer layer is about 5%–20% of the total thickness of the structural member.

16. The structural member according to claim 1, in which the respective outer layer comprises upper and lower outer layers of a material with the same modulus of elasticity as the inner layer.

17. The structural member according to claim 1, in which the respective outer layer comprises upper and lower outer layers of a material having a higher modulus of elasticity than the inner layer.

18. The structural member according to claim 1, in which the inner layer is made of PP or PA and is at least 20% foamed.

19. The structural member according to claim 1, further comprising fillers added to the inner layer.

20. The structural member according to claim 19, in which the fillers comprise talc or glass fiber.

21. The structural member according to claim 1, in which the respective outer layer is comprised of thermoplastic material.

22. The structural member according to claim 21, in which the thermoplastic material is at least polymide or polypropylene.

23. The structural member according to claim 1, in which the respective outer layer has additives to raise at least one of impact resistance, UV resistance, weather resistance and wear resistance.

24. The structural member according to claim 1, further comprising a slip layer on an outer surface of the respective outer layer.

25. The structural member according to claim 24, in which the slip layer is about 0.1–0.5 mm thick and has friction-reducing additives.

26. The structural member according to claim 1, in which the layers of substantially higher modulus of elasticity have on one side a layer of adhesion primer for the inner layer and on a second side a layer of adhesion primer for the outer layer.

27. The structural member according to claim 1, in which the layers of substantially higher modulus of elasticity have the same modulus of elasticity as each other.

28. The structural member according to claim 1, in which the layers of substantially the same modulus of elasticity have the same thickness as each other.

29. The structural member according to claim 1, further comprising side surfaces of the structural member, the layers of substantially the same modulus of elasticity extending substantially to the side surfaces.

30. The structural member according to claim 1, in which the modulus of elasticity of the structural member depends upon adhesive bonding between the inner layer and the layers with substantially higher modulus of elasticity and between the respective outer layer and the layers with substantially higher modulus of elasticity.

31. The structural member according to claim 1, in which the modulus of elasticity of the structural member depends upon a cross sectional composite and the modulus of elasticity of individual layers.

32. A process for production of elongate structural member having at least one system plane along which the structural member has substantially homogeneous properties and is substantially homogeneously constructed, with at least one inner layer of plastic along the system plane, a respective outer layer of plastic along the system plane, and at least two respective layers of a material of a substantially higher modulus of elasticity than plastic traversing the system plane and located within the structural member between the inner layer and the outer layer and arranged separate from each other and not connected by a middle region of the same material of said at least respective layer, comprising the following steps:

a) supplying an unfoamed inner layer from an extruder to a coextrusion nozzle, b) supplying by means of the coextrusion nozzle a respective layer of substantially higher modulus of elasticity taken off from a respective sheet metal coil to an upper side and a lower side of the inner layer, c) applying a respective outer layer by means of the coextrusion nozzle to the layers of substantially higher modulus of elasticity, d) supplying a multilayer composite emerging from the coextrusion nozzle to a gauging, e) withdrawing the multilayer composite from the gauging after the inner layer has foamed, and cutting the multilayer composite into structural members.

33. The process according to claim 32, further comprising applying a respective slip layer to a respective outer layer with an extruder or with the coextrusion nozzle.

34. The process according to claim 32, further comprising applying a layer of an adhesion primer to the respective layer with substantially higher modulus of elasticity before the respective layer of substantially higher modulus of elasticity is supplied to the coextrusion nozzle.

35. The process according to claim 32, further comprising forwarding a multilayer composite emerging from the gauging by means of a takeoff device.

36. The process according to claim 32, further comprising applying a prestress to the structural member in the direction of the principal axis of the structural member.

37. The process according to claim 36, further comprising using a calendering technique for gauging.

38. The process according to claim 35, further comprising using a saw device that travels in the forwarding direction and follows the takeoff device.

* * * * *